May 3, 1966   C. U. DEATON   3,249,074
DOORS
Filed Oct. 5, 1962   11 Sheets-Sheet 1
FIG. 1
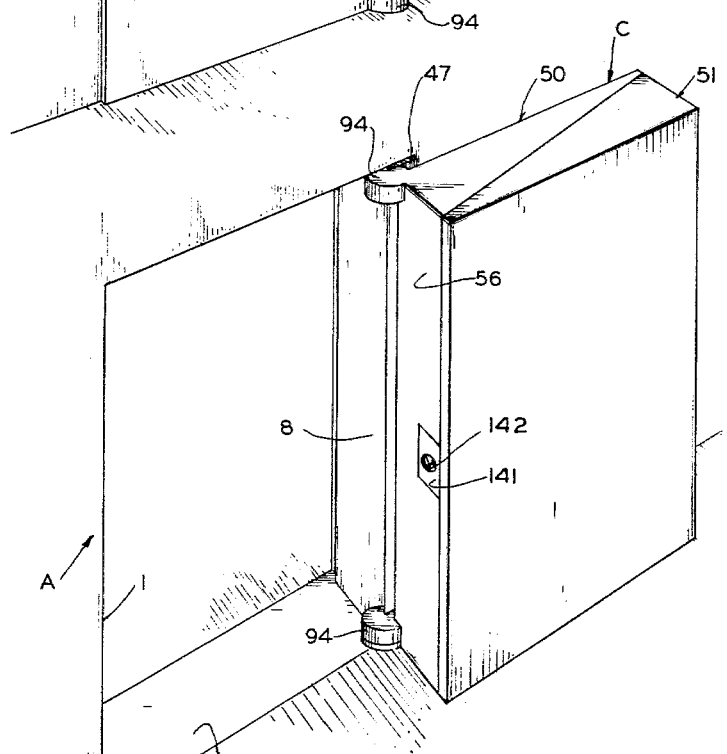
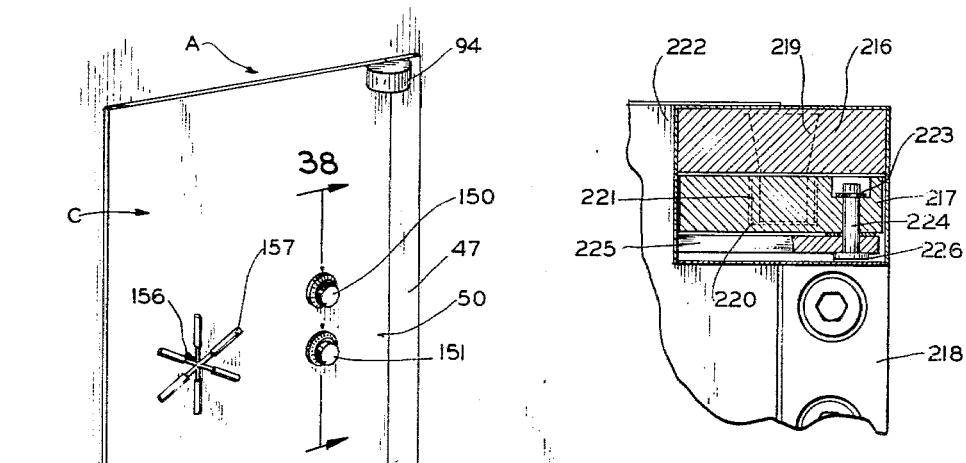
FIG. 37
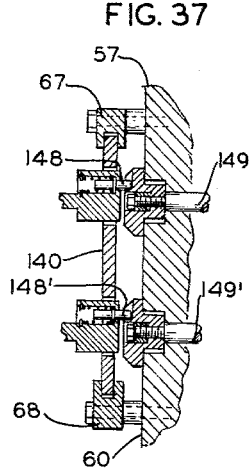
FIG. 38
FIG. 2
INVENTOR.
CHARLES U. DEATON
BY *Alfred W Petchaft*
ATTORNEY

*INVENTOR.*
CHARLES U. DEATON
BY
*Alfred W. Petchaft*
ATTORNEY

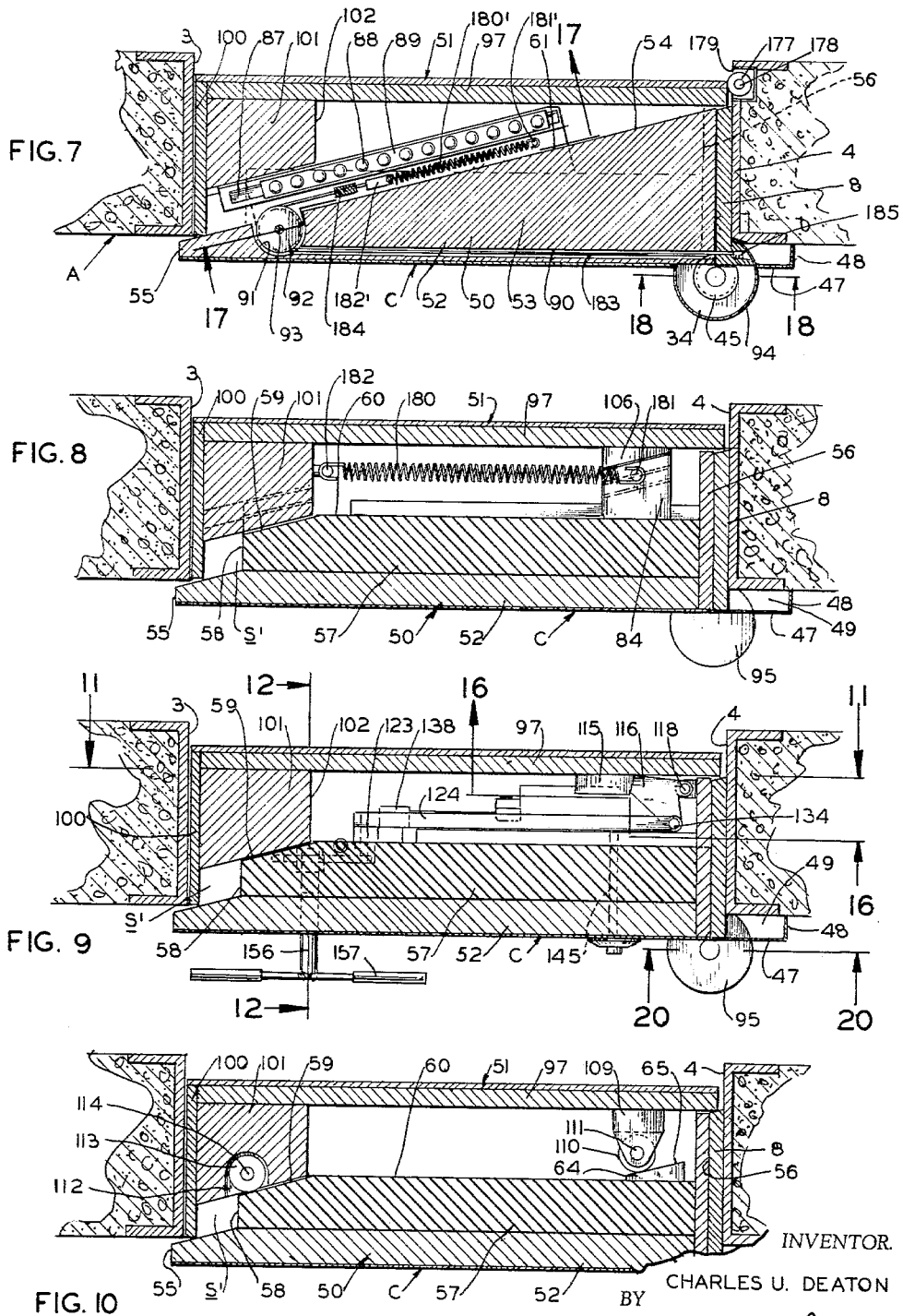

May 3, 1966     C. U. DEATON     3,249,074
DOORS
Filed Oct. 5, 1962     11 Sheets-Sheet 5

INVENTOR.
CHARLES U. DEATON
BY
ATTORNEY

May 3, 1966  C. U. DEATON  3,249,074
DOORS
Filed Oct. 5, 1962  11 Sheets-Sheet 6

INVENTOR.
CHARLES U. DEATON
BY
ATTORNEY

May 3, 1966  C. U. DEATON  3,249,074
DOORS
Filed Oct. 5, 1962  11 Sheets-Sheet 7

INVENTOR.
CHARLES U. DEATON
BY
ATTORNEY

May 3, 1966  C. U. DEATON  3,249,074
DOORS
Filed Oct. 5, 1962  11 Sheets-Sheet 8

INVENTOR.
CHARLES U. DEATON
BY
*Alfred W. Petchaft*
ATTORNEY

May 3, 1966     C. U. DEATON     3,249,074
DOORS

Filed Oct. 5, 1962     11 Sheets-Sheet 9

INVENTOR.
CHARLES U. DEATON
BY
*Alfred W. Petchaft*
ATTORNEY

May 3, 1966 C. U. DEATON 3,249,074
DOORS
Filed Oct. 5, 1962 11 Sheets-Sheet 11

INVENTOR.
CHARLES U. DEATON
BY
ATTORNEY

3,249,074
DOORS
Charles U. Deaton, 1535 Hoyt St., Lakewood, Colo.
Filed Oct. 5, 1962, Ser. No. 228,561
18 Claims. (Cl. 109—76)

This invention relates in general to certain new and useful improvements in doors and, more particularly, to an improved type of door used as a closure element in vaults, safes, and the like.

In order to prevent unauthorized entry, banks and similar institutions housing large sums of currency and other valuable items use vault doors having a relatively thick cross-section. Generally speaking, most vault doors are hingedly connected to a frame of the vault or enclosure which houses the valuables and are provided with some type of high-security lock such as a combination lock, time-lock, or both. Since doors of this type must be designed to withstand burglary, safe-cracking, the force of explosive charges, and other similar forms of abuse, they are built of a rather sturdy construction and are relatively thick. In fact, vault doors are classified by banks in terms of the horizontal thickness of hardened steel plate which is interposed in the doorway.

To accommodate such thicknesses it has conventionally been considered both essential and desirable to form the edge-faces of the door-jambs and vault doors in a series of interfitting or internesting steps, the edge-faces of which taper slightly inwardly so that the vault door, when unlocked, can swing freely out of the door-opening, notwithstanding its thickness.

Since vault doors of the conventional type swing freely out of the door-opening, it is necessary to provide a plurality of laterally extensible locking bars or pins which, when locked, project into retentive recesses formed in the door-frame. These locking bars or pins are usually actuated through a train of gears by a manually operable handle which is locked by a combination lock. Therefore, in order to break into such a vault, it is merely necessary to sever, break, or destroy the laterally projecting locking bars or to breach the combination and gain access to the retracting mechanism so as to operate it and draw the locking bars or pins into unlocked position.

In addition to security problems, such conventional vault doors present certain architectural problems. The majority of commercial buildings today are being built on square and rectangular plans with nearly all surfaces at right angles to each other. This is a normal outgrowth of real estate requirements and structural economy, as well as the current architectural approach to esthetics. Several architectural styles have emerged based on rectangular composition. In most of these styles, the architects design their buildings in a manner so that all elements are essentially rectilinear. Components which are not rectilinear or have angles other than 90 degrees are regarded as non-conforming to the rectilinear approach in design. Conventional vault doors which are beveled on the sides for the practical reasons of clearance in swinging in and out of the opening create an architectural element of an angular nature which appears in conflict with the rectilinear approach in the current architectural styling when the vault door stands open during daytime business hours. Therefore, to conform to the modern concept of rectangular style, it would be highly desirable to employ a vault door which is strictly rectangular and block-like.

It is, therefore, the primary object of the present invention to provide a vault door and a supporting frame therefor which is capable of being rigidly secured to the wall of a vault, safe, or the like.

It is another object of the present invention to provide a vault door which is essentially rectilinear and, when standing open, during banking hours, will appear to be a solid, rectilinear block of steel of massive appearance conforming to the modern architectural concept of rectilinear design.

It is also an object of the present invention to provide a vault door that will be adaptable to various installation requirements such as, for example, omission of the traditional architrave so as to surround the door with a minimum of trim and thereby employ jamb members which are set back from the face of the door to permit plaster, wood, marble, or other finishes to be applied over the jamb and meet a narrow trim member at the opening of the door.

It is an additional object of the present invention to provide a vault door of the type stated which consists of two parts which are laterally slidable relative to each other so as to move into and out of rectilinear block-form during the opening and closing thereof and to be locked in such block-form when in closed position, thereby being immovably wedge-locked in closure-forming position against unauthorized opening or displacement.

It is an additional object of the present invention to provide a vault door of the type stated which consists of two parts which are laterally slidable relative to each other so as to move into and out of rectilinear block-form during the opening and closing thereof and thereby present a completely rectilinear appearance when standing open during banking hours.

It is also an object of the present invention to provide a vault door of the type stated which includes a unique set of hinges capable of withstanding the heavy weight improved thereon by the body of the door.

It is yet another object of the present invention to provide a vault door and supporting frame therefor of the type stated which is not only rigid and sturdy in its construction but is relatively economical to manufacture.

With the above and other objects in view, my invention resides in the novel features of form, construction, arrangement, and combination of parts presently described and pointed out in the claims.

In the accompanying drawings (eleven sheets):

FIG. 1 is a fragmentary perspective view of the front or doorway wall of a bank vault equipped with a vault door constructed in accordance with and embodying the present invention, the vault door being shown in closed position relative to the frame;

FIG. 2 is a fragmentary perspective view of the front or doorway wall of a bank vault equipped with a vault door constructed in accordance with and embodying the present invention, the vault door being shown in open position relative to the frame;

Figure 3:
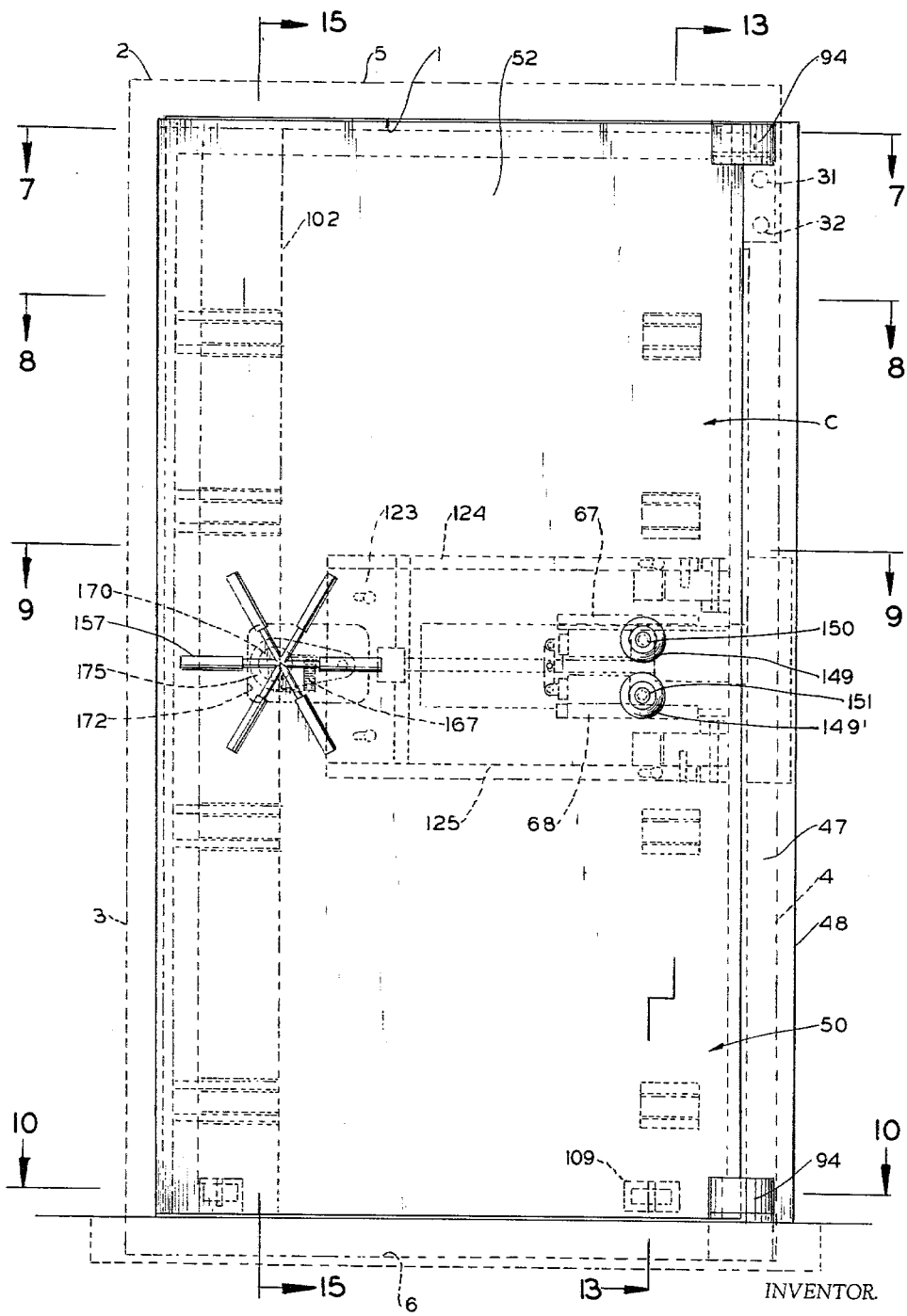
FIG. 3 is a front elevational view of the vault door and supporting frame, the vault door being shown in closed position.
Figure 4:
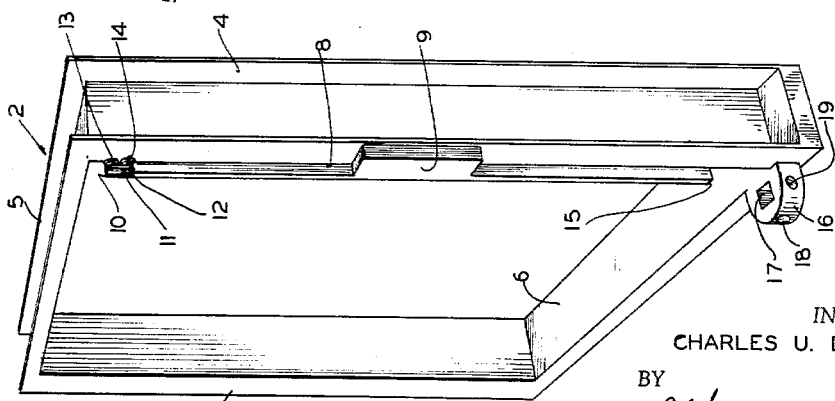
FIG. 4 is a perspective view of the door-frame forming a part of the present invention.
Figure 11:
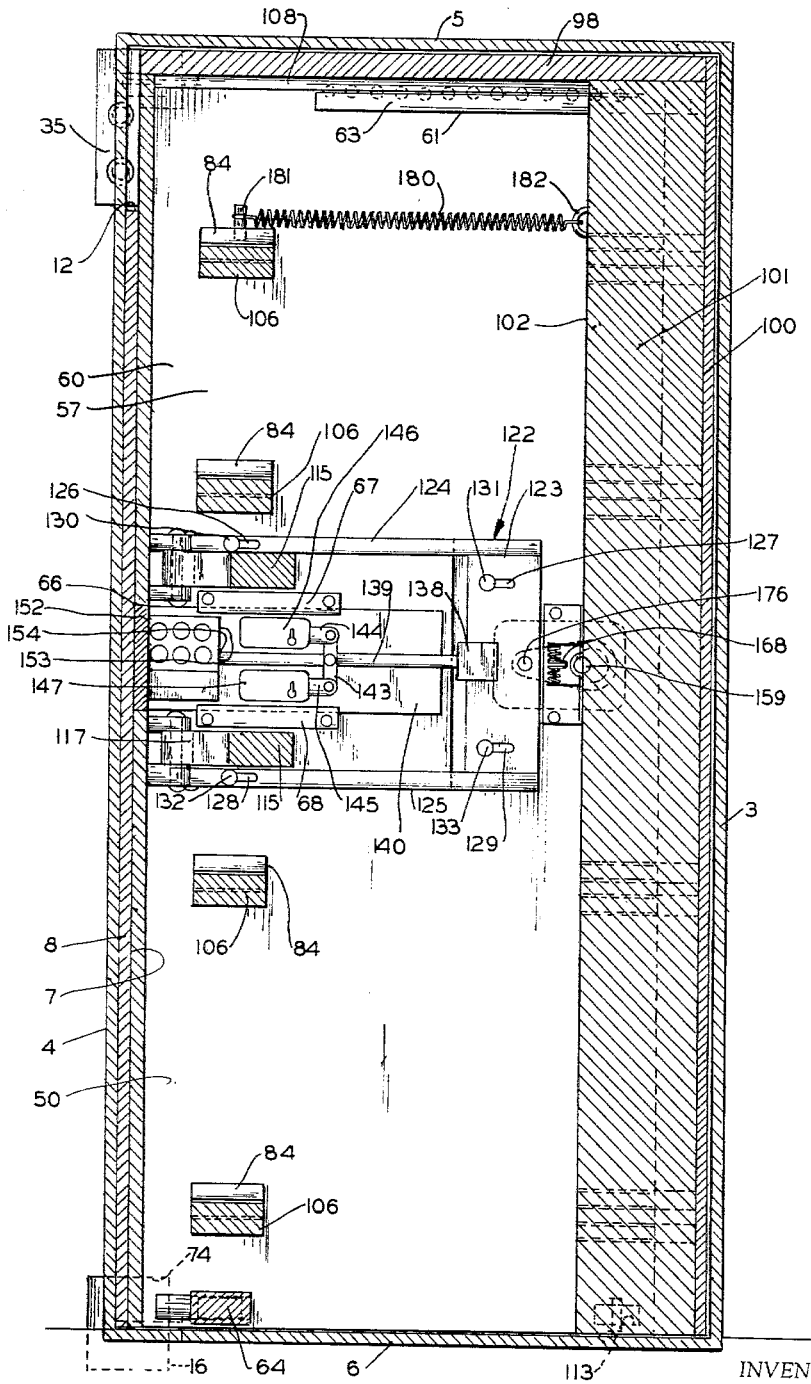
Figure 13:
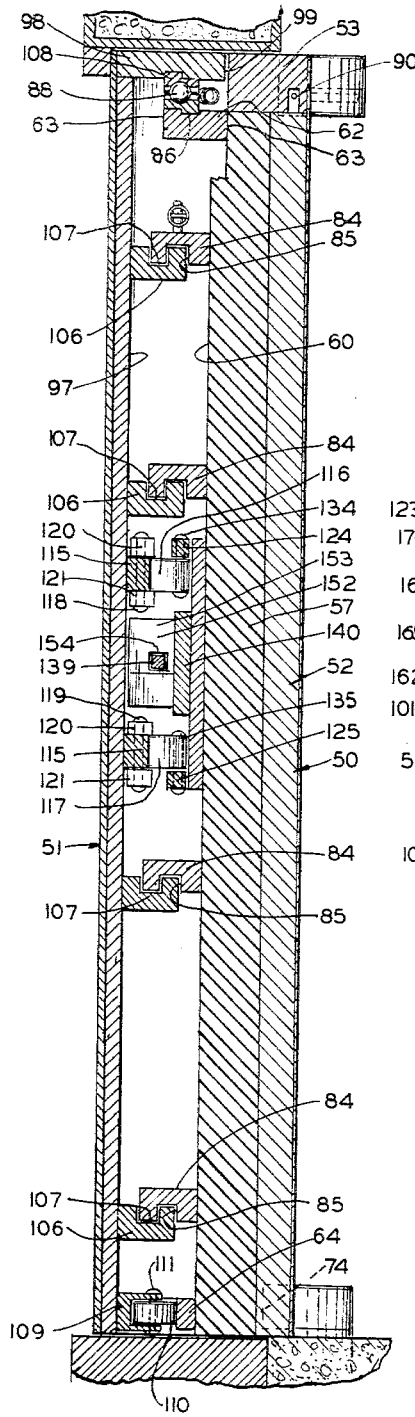
Figure 12:
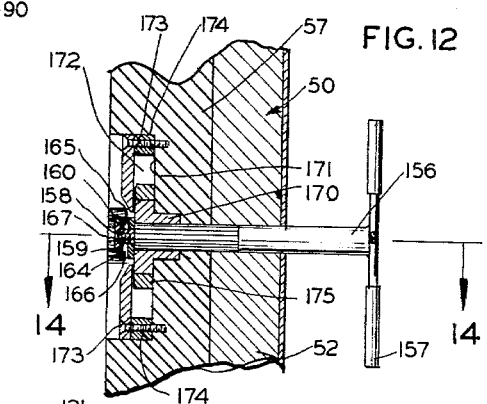
Figure 14:
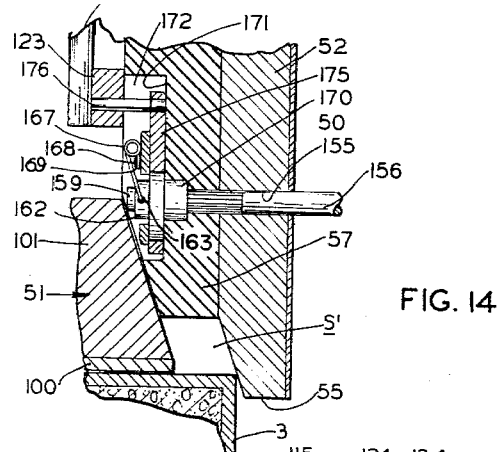
Figure 16:
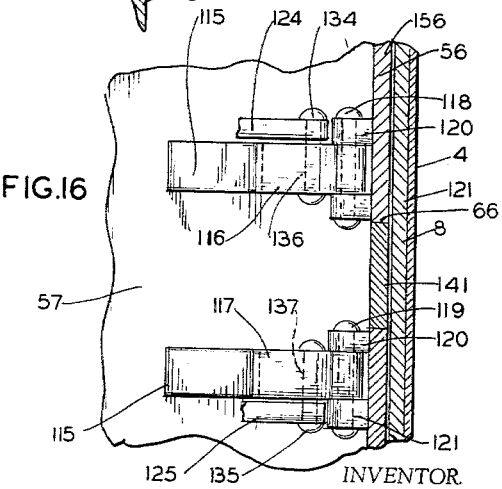
Figure 15:
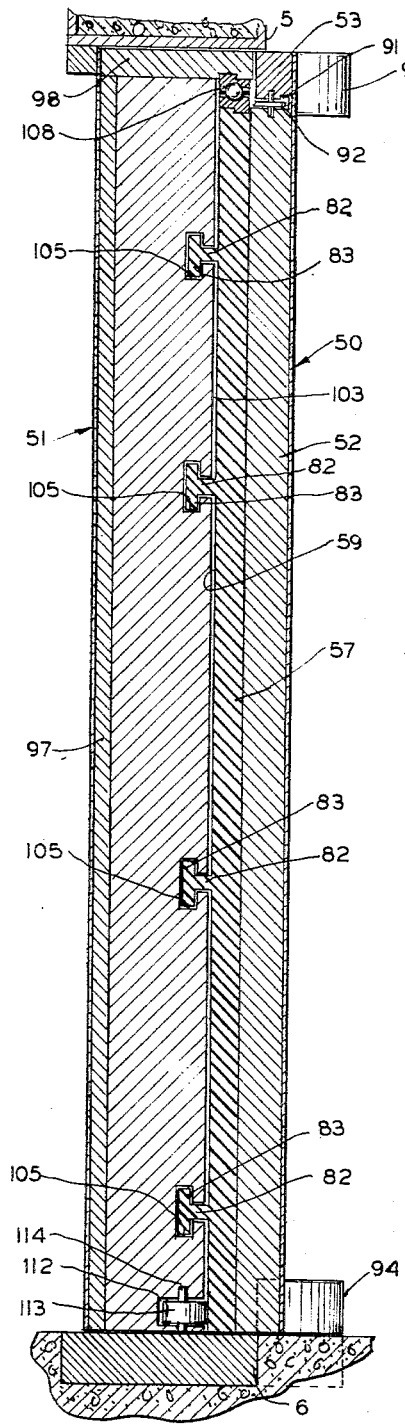
Figure 17:
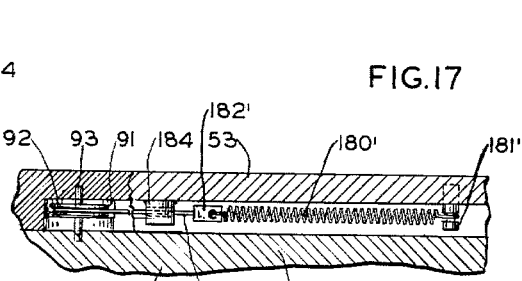
Figure 18:
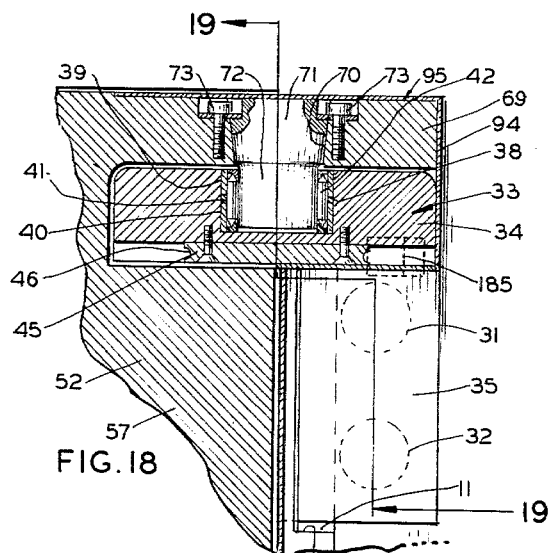
Figure 19:
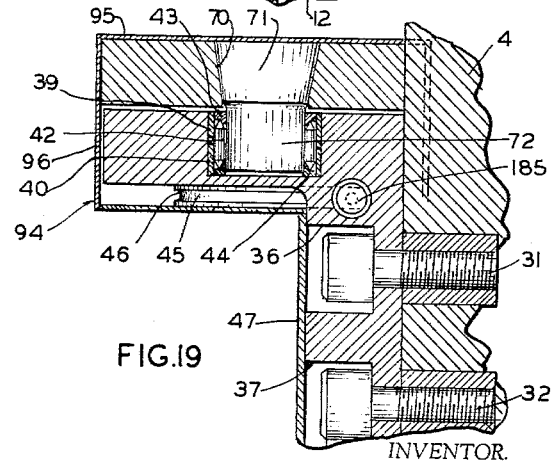
Figure 20:
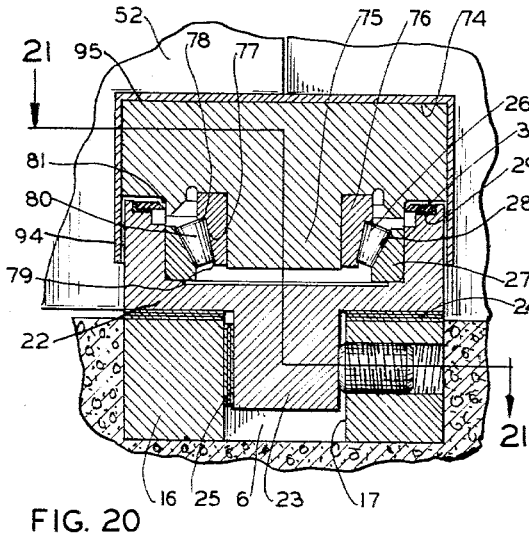
Figure 21:
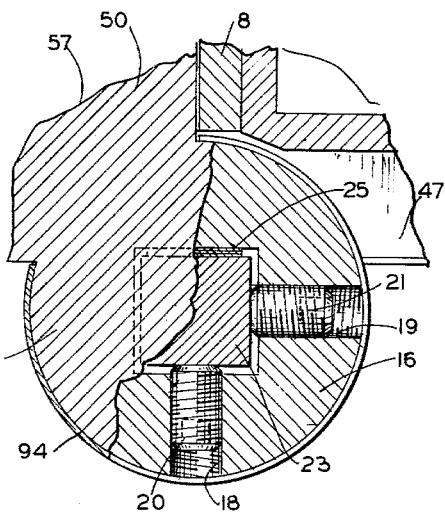
Figure 22:
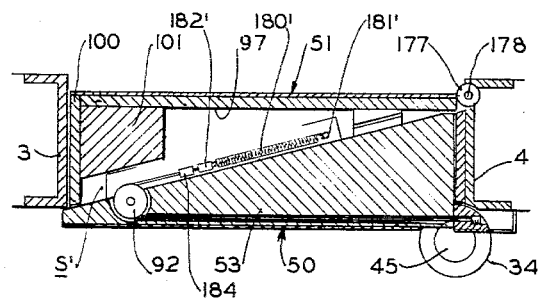
Figure 23:
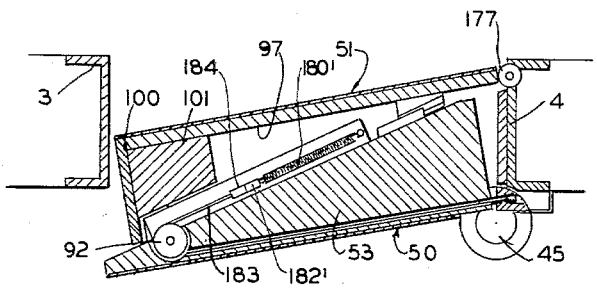
Figure 24:
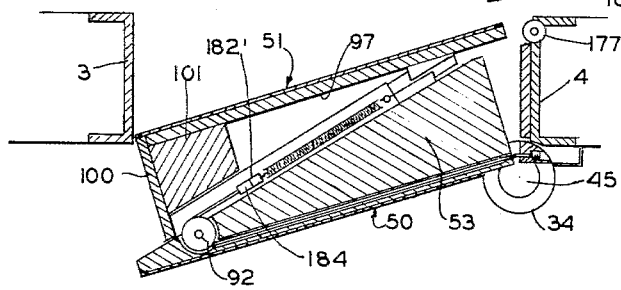
Figure 25:
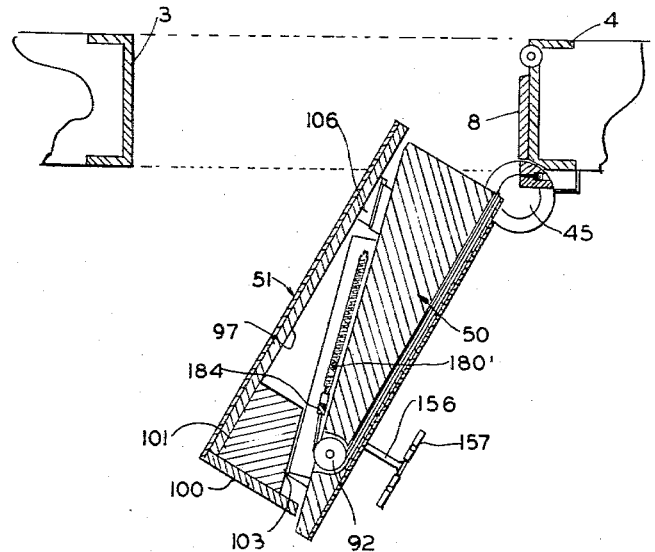
Figure 26:
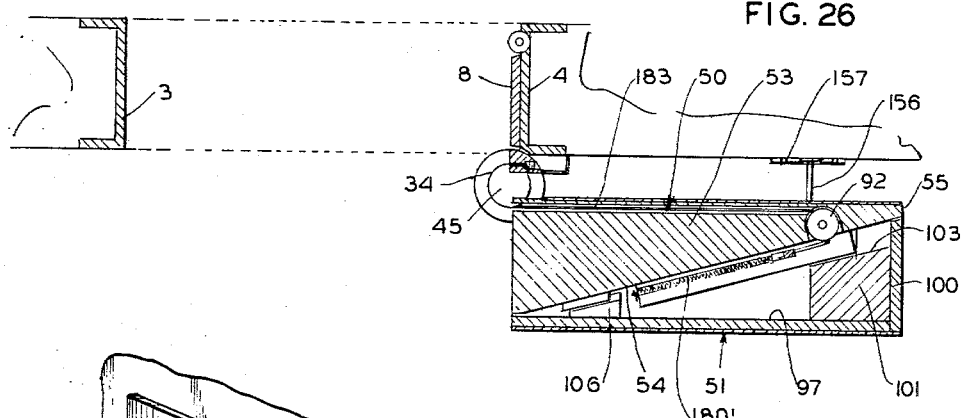
Figure 27:
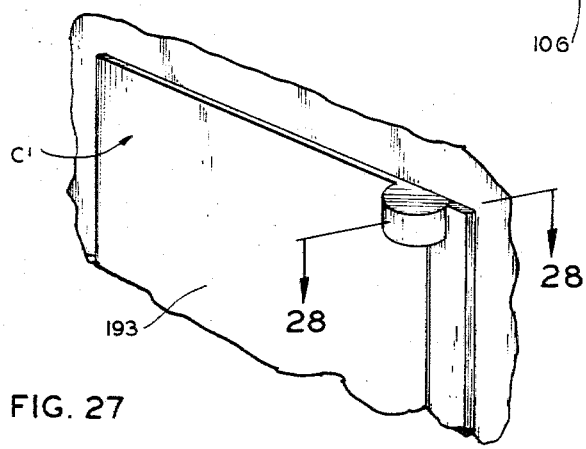
Figure 28:
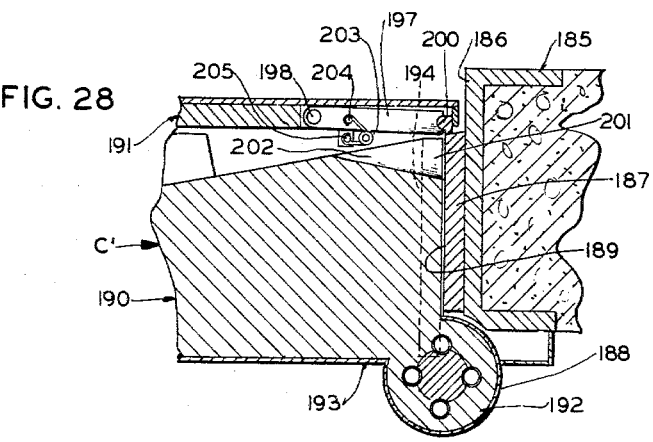
Figure 29:
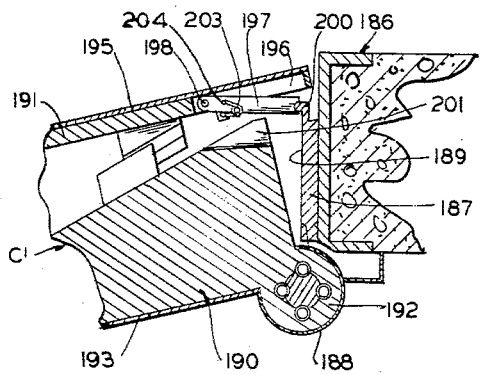
Figure 30:
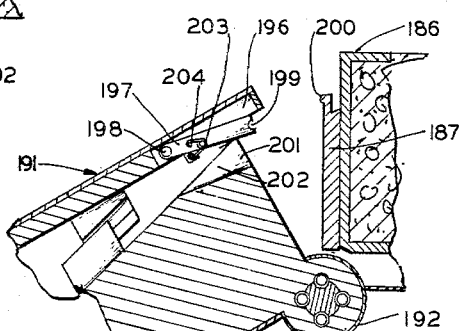
Figure 31:
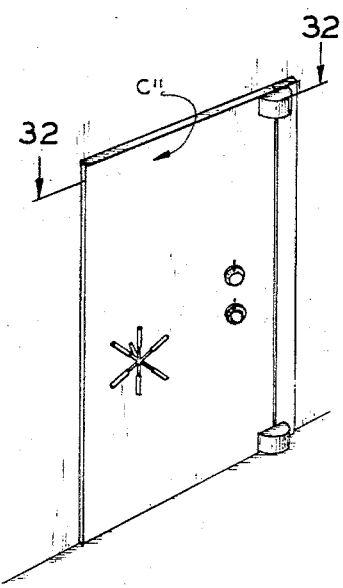
Figure 32:
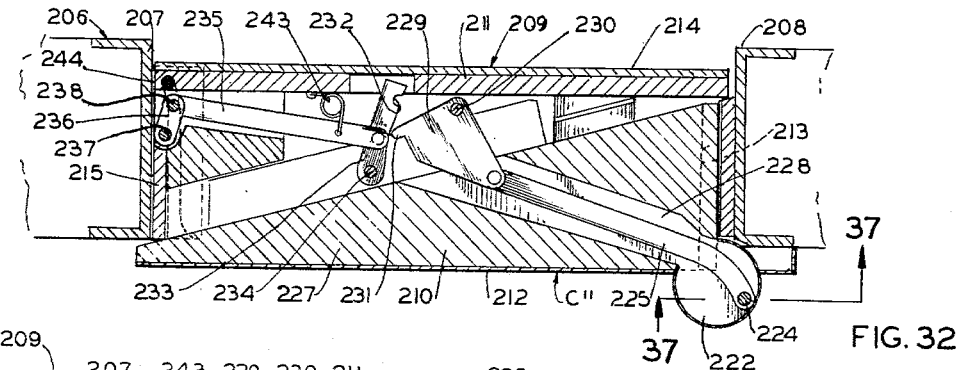

FIGS. 7, 8, 9, and 10 are horizontal sectional views taken along lines 7—7, 8—8, 9—9, and 10—10, respectively, of FIG. 3;

FIGS. 11 and 12 are fragmentary sectional views taken along lines 11—11 and 12—12, respectively, of FIG. 9;

FIG. 13 is a vertical sectional view taken along line 13—13 of FIG. 3;

FIG. 14 is a fragmentary sectional view taken along line 14—14 of FIG. 12;

FIG. 15 is a vertical sectional view taken along line 15—15 of FIG. 3;

FIG. 16 is a fragmentary sectional view taken along line 16—16 of FIG. 9;

FIGS. 17 and 18 are fragmentary sectional views taken along lines 17—17 and 18—18, respectively, of FIG. 7;

FIG. 19 is a fragmentary sectional view taken along line 19—19 of FIG. 18;

FIG. 20 is a fragmentary sectional view taken along line 20—20 of FIG. 9;

FIG. 21 is a fragmentary sectional view taken along line 21—21 of FIG. 20;

FIGS. 22, 23, 24, 25, and 26, are horizontal sectional views similar to FIG. 4 showing the successive positions of the vault door as it swings from fully closed position to fully open position;

FIG. 27 is a fragmentary perspective view of a modified form of vault door constructed in accordance with and embodying the present invention;

FIG. 28 is a fragmentary horizontal sectional view taken along line 28—28 of FIG. 27;

FIGS. 29 and 30 are fragmentary horizontal sectional views similar to FIG. 28 showing the vault door of FIG. 27 in successive positions as it moves from closed position to open position;

FIG. 31 is a fragmentary perspective view of the front or doorway wall of a cank vault equipped with another modified form of vault constructed in accordance with and embodying the present invention;

FIG. 32 is a horizontal sectional view taken along line 32—32 of FIG. 31;

FIGS. 33, 34, 35, and 36 are horizontal sectional views similar to FIG. 32 showing the successive positions of the vault door of FIG. 31 as it swings from closed position to open position;

FIG. 37 is a fragmentary sectional view taken along line 37—37 of FIG. 32; and

FIG. 38 is a fragmentary sectional view taken along line 38—38 of FIG. 1.

Referring now in more detail and by reference characters to the drawings, which illustrate practical embodiments of the present invention, A designates a front or doorway wall for a bank vault having a door-opening 1 bounded and defined by a door-frame 2 consisting of a pair of upright jambs 3, 4, welded at their upper and lower margins, respectively, to a horizontal transom 5 and a horizontal sill 6, all preferably formed of a relatively heavy steel channel-beam construction. For convenience of reference, the jamb 3 can be called the facing jamb and the jamb 4 can be called the hinge jamb. The door-framt 2 is conventionally set into place and the wall A preferably formed in situ by pouring concrete into suitable forms so that resulting structure is heavily reinforced, monolithic and highly resistant to burglary.

Welded or otherwise rigidly secured to the inwardly presented face 7 of the hinge jamb 4 is a relatively heavy steel plate 8 which is centrally reinforced by a welded back-up block 9 as best seen in FIG. 4. At its upper end, the plate 8 is provided with a transversely extending top face 10, which is spaced below the downwardly presented face of the transom 5 by a distance sufficient to afford hinge clearance for purposes presently more fully appearing. Along its forward margin, the plate 8 projects beyond the forward face of the hinge jamb 4 by a distance equal to the thickness of the back-up block 9 and, in the region of its upper corner, the plate 8 is cut away in the provision of a rectilinear recess 11 which provides a narrow horizontal shoulder 12 and also establishes clearance in front of two vertically spaced internally threaded horizontal holes 13, 14. At its lower end, the plate 8 is provided with a transversely extending end-face 15 which is spaced above the upwardly presented face of the sill 6 by a distance sufficient to afford hinge-clearance for purposes presently more fully appearing.

Formed integrally with and projecting horizontally forwardly from the sill 6 directly beneath the plate 8 is a bearing-ear 16 provided with a rectangular recess 17 extending vertically therethrough and a pair of horizontal internally threaded apertures 18, 19, preferably located at right angles to each other for receiving set screws 20, 21. Seated upon the upper face of the bearing-ear 16 is a bearing cup 22 which is integrally provided with a downwardly projecting axial stud 23 which is of rectangular cross-section and substantially smaller in size than the rectangular recess 17 so as to fit loosely therein. Both the vertical and axial positions of the bearing cup 22 are adjusted by means of a series of shims 24, 25, and the bearing cup 22 is held rigidly in place by means of the set screws 20, 21, which are tightened down against the lateral faces of the stud 23. In its upwardly presented face, the bearing cup 22 is provided with a coaxial cylindrical bearing socket 26 and seated therein is a hardened race-forming bearing ring 27 which is, in turn, provided with an angular bearing face 28. At its upper end, the bearing socket 26 is counterbored in the provision of a shallow recess 29 for snugly and retentively receiving a grease-retaining ring 30, all as best seen in FIGS. 20 and 21.

Rigidly secured within the recess 11 by means of bolts 31, 32 reference being made to FIGS. 18 and 19, and extending over the top of the plate 8 to the hinge clearance space is an upper hinge bearing 33 which integrally includes a horizontally extending cylindrical bearing cup 34 and a block-shape vertical leg element 35, the latter being of such size and shape as to fit snugly within the recess 11 and having suitable countersunk bore holes 36, 37, for receiving the heads and shanks of the bolts 31, 32, respectively. The upper hinge bearing 33 has a vertical dimension or thickness approximately equal to half the vertical dimension of the hinge clearance space between the upper margin of the plate 8 and the under face of the transom 5 and is provided, in its upwardly presented face, with a cylindrical bearing socket 38 which is internally provided with snug-fitting axially spaced race-forming hardened bearing rings 39, 40, the axial space 41 between the bearing rings 39, 40, serving to transmit lubricant to a plurality of needle-shaped bearing rollers 42, which are disposed annularly within the bearing rings 39, 40, and held in place by conventional needle-bearing retainer rings 43, 44. As will be seen by reference to FIG. 3, the vertical centerline of the bearing sockets 26, 38, should be precisely coincident and this can be accomplished by varying the thickness and number of shims which are used opposite the set screws 20, 21.

Bolted, welded, or otherwise rigidly secured upon the under face of the bearing cup 34 is a 270° segmental pulley 45 having an inwardly dished semi-circular rim-channel 46. The pulley 45 is cut out in a right-angle notch so as to fit snugly around the corner of the leg element 35. Moreover, the pulley 45 is substantially smaller in diametral size than the bearing cup 34 and has its centerline coincident with the centerlines of the bearing cups 22, 34.

As will be noted by reference to FIG. 7, the hinge jamb 4 is somewhat narrower in horizontal width than the facing jamb 3, the transom 5, and the sill 6, and the difference in width is made up by the amount of forward projection of the plate 8, the forwardly presented longitudinal face of the plate 8 also being spaced inwardly a slight distance from the common plane of the forwardly presented flange faces of the facing jamb 3, transom 5, and sill 6. This spacing allows for the overlying application of a face plate 47, which may be welded to the forwardly presented edge-face of the plate 8 after the bolts 31, 32, have been installed. The face plate 47 extends from top to bottom of the plate 8 and projects laterally therefrom in parallelism with the face wall A to a distance beyond the width of the flanges in the hinge jamb 4 and, on its remote longitudinal edge, the face plate 47 is provided with a rearwardly extending flange 48, thereby forming a neat and attractive covering trim, as well as a concealment to render the bolts 31, 32, inexcessible. Actually, the vault door of the present invention as will presently more fully appear, is so constructed that it cannot be removed from the door-opening by safe-crackers even if the hinge supporting mechanism were to be blown off by dynamite, but the inexcessibility and concealment afforded to the bolts 31, 32, by the face plate 47 provides some desirable additional measure of security.

It will be noted that the width of the flange 48 is substantially equal to the distance by which the forwardly presented or so-called "outer" surface of the vault door C projects beyond the surface of the face wall A and the space 49 enclosed by the face plate 47 and flange 48 is of the shallower depth than the clearance between the surface of the face wall A and the outer surface of the vault door C when the latter is swung into fully open position.

Figure 6:
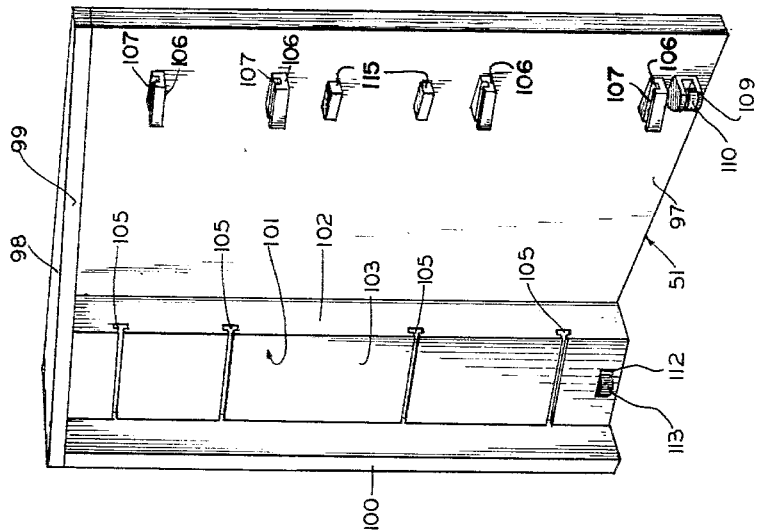
FIG. 6 is an interior perspective view of the rear door section forming a part of the vault door shown in FIGS. 1 and 2.
Figure 5:
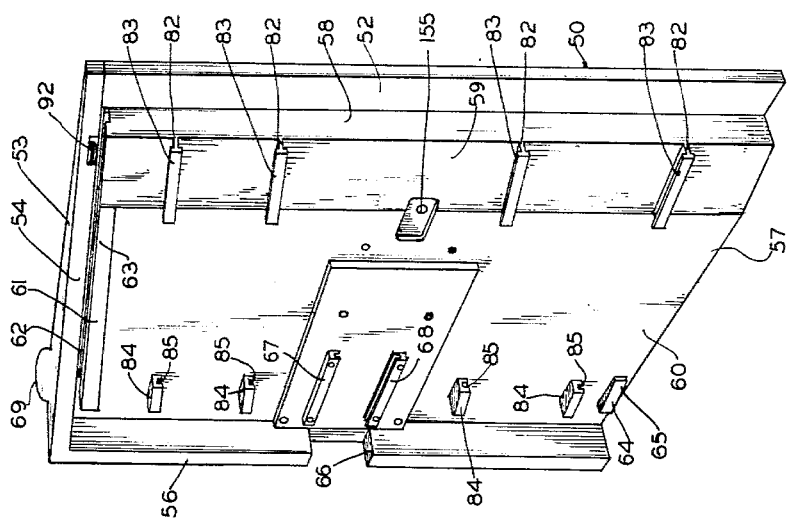
FIG. 5 is an interior perspective view of the front door section forming a part of the vault door shown in FIGS. 1 and 2.

Disposed in snug-fitting closure-forming disposition within the door-opening 1 is a vault door C comprising two more or less wedge-shaped sections, namely, a front section 50 and a rear section 51. The terms "front" and "rear," as used in reference to the sections 50, 51, have reference to the relative position of the sections 50, 51, when the vault door C is in closure-forming position within the door-opening 1. As will be immediately apparent by reference to FIG. 2, when the vault door C is in open position, the so-called front section 50 is actually positioned to the rear in proximity to the forwardly presented surface of the face wall A and, correspondingly, the so-called rear section 51 is presented outwardly to public view. Moreover, the front section 50 and the rear section 51 are not actually solid wedge-shaped blocks of steel, but, rather, are internally skeletonized to afford a requisite internal free space for housing the internal mechanism, combination locks, time clocks, and so on, the net geometrical effect of the structure, however, being that of two facewise superposed laterally sliding wedges, as best seen in FIGS. 5 and 6.

Referring again to FIG. 5, the front section 50 integrally includes a rectangular face plate 52 provided along its top margin with a relatively thick horizontal top plate 53 which is of triangular form and has a rearwardly presented obliquely extending vertical face 54. At its one lateral end, the top plate tapers to a thickness equal to the thickness of the face plate 52 to provide a relatively thin stop-forming lip 55 which will project along, and overlie, the forwardly presented vertical edge of the facing jamb 3. At its opposite lateral margin, that is to say the margin which will be adjacent to the hinge jamb 4, the top plate 53 is flush with, and integrally joined to, a vertically extending flange plate 56, the outer face of which is adapted to lie snug-fitting flush abutment against the opposing face of the hinge jamb 4 when the vault door C is in closed position. This flange plate 56 is in effect the lateral face or head of the wedge forming the exterior section of the vault door C. As will be seen by reference to FIG. 5, the flange plate 56 is integrally joined along its forward vertical margin to the proximate lateral margin of the face plate 52. Integrally secured to the inwardly presented faces of the flange plate 56 and to the downwardly presented interior face of the top plate 53 is a slab 57 formed of heavy armor plate or drill-resistant steel. The slab 57 extends horizontally across the interior of the front section 50, terminating in a vertical transverse end-face 58 which is spaced laterally inwardly from the lip portion 55 so that, the vault door C is in closed position, the end-face 58 will be spaced from the rearwardly presented face of the facing jamb 3 by a predetermined distance sufficient to afford adequate operating clearance-space $s^1$ to permit movement of the rear section 51, all as best seen in FIGS. 8 and 9, and for purposes presently more fully appearing.

Laterally adjoining the end-face 58 and extending inwardly therefrom is an oblique face 59 which is located inwardly from, and in parallel relation to, the vertical face 54 of the top plate 53. On its inner vertical margin, the oblique face joins a rearwardly presented flat face 60 which is parallel to the forwardly presented surface of the face plate 52 and is spaced rearwardly from the plane of the vertical rear margin of the flange plate 56. In this connection, it should be noted that the front section 50 can be fabricated by forging and casting as a single integral piece or can be made up as a weldment from a series of separate sections. It will, of course, be understood that if the front-section 50 is fabricated as a weldment, all exposed joints and seams will be ground down and polished so that the entire front section 50 will be integral and unitary, both in structure as well as in appearance.

Welded or otherwise rigidly secured to the face 60 of the slab 57 adjacent the top thereof is a triangular filler-plate 61 having a top face 62 which is flush or coplanar with the top face of the slab 57 and similarly having a rearwardly presented vertical oblique face 63 which is coplanar with the oblique face 59 of the slab 57. Similarly welded to the face 60 of the slab 57 adjacent the lower end thereof is a small triangular runner-block 64 which has a rearwardly presented vertical oblique face 65 spaced inwardly from, but parallel to, the oblique faces 59, 63.

As will be seen by reference to FIG. 5, the flange plate 56 is provided, approximately midway of its vertical length, with a rectilinear and somewhat U-shaped cutout or recess 66 and bolted or otherwise rigidly secured upon the flat face 60 of the slab 57 in upwardly and downwardly spaced relation respectively to the upper and lower margins of the recess 66 are two companion-shaped slide rails 67, 68.

Formed integrally with the forward corner of the top plate 53 adjacent to the hinge jamb 4 is a forwardly projecting cylindrical hinge-boss 69 which is of substantially the same outside perimetral size as, and is adapted to overlie, the bearing cup 34. Referring now to FIG. 18, the hinge-boss 69 is axially provided with a concentric somewhat tapered aperture 70 to snugly accommodate a downwardly projecting pintle 71 having a cylindrical section 72 which fits bearing-wise within the bearing rollers 42. The pintle 71 is maintained within the hinge-boss 69 by means of a plurality of short vertical screws 73. Similarly, the face plate 52 is integrally provided at its lower corner adjacent to the hinge jamb 4 with a forwardly projecting cylindrical hinge-boss 74 which is machined on its underface to provide a downwardly extending cylindrical pintle-portion 75 which is snugly seated within a bearing ring 76, the outer face of which is suitably machined with a tapered surface 77 and annular shoulders 78, 79, for operatively retaining and bearing against tapered roller thrust bearings 80 which, in turn, bear against the bearing face 28 of the bearing ring 27. The underface of the hinge-boss 74 is also provided with a downwardly projecting annular sealing flange 81 which rotatively slides against the grease-retaining ring 30 and has the dual effect of retaining lubricant within the bearing socket 26 and excluding dirt and other deleterious substances therefrom. It should be noted in this connection that the lower bearing is actually a roller thrust bearing and must be of such size and structural design as to support the heavy weight of the vault door C. The upper bearing provided by the bearing roller 42 is merely a rotary bearing which guides the outwardly swinging movement of the vault door C and does not receive any downward component of force due to the weight of the vault door C. Consequently, the vertical distance between the bearing cups 22, 34, is adjusted to achieve this result by utilizing a proper number of shims 24, the thickness of the shims 24 being sufficient to provide a very small, but, nevertheless, definite amount of vertical clearance space between the under face of the hinge-boss 69 and the upper face of the bearing cup 34.

Welded to the oblique face 59 and projecting perpendicularly therefrom are four vertically spaced slide rails 82 which are integrally provided at their rear ends with head-rails 83 extending upwardly and downwardly from the slide rails 82 in the manner of the head of a T. Similarly welded to and projecting rearwardly from the face 60 of the slab 57 adjacent to the flange plate 56 are four horizontal detent plates 84, each being provided in its underface with a downwardly opening transversely extending groove or slot 85. Preferably, though not necessarily, the slide rails 82 and detent plates 84 are transversely aligned in horizontally registering pairs across the interior face of the front section 50 substantially as shown in dotted lines in FIG. 5.

Welded or otherwise rigidly secured to and extending lengthwise along the upwardly presented top face 62 of the filler plate 61 and the coplanar top surface of the slab 57 which projects rearwardly from the vertical face 54 of the top plate 53, is an elongated slide-bearing plate 86 having a longitudinally extending raceway 87 for receiving a plurality of ball bearings 88 which are, in turn, held in spaced relationship by a suitably apertured retainer plate 89, which is of conventional construction, common to drawer slides, table slides, and the like. Finally, the top plate 53 is suitably drilled or milled out in the region just above the plane of the top face 62 so as to provide a transversely extending slot 90 which opens at one end upon the external face of the flange plate 56 in the region of the hinge clearance space above the recess 11 of the plate 8. At its other end, the slot 90 opens upon the obliquely extending vertical face 54 of the top plate 53 just inwardly from the end face 58 of the slab 57 and at such end the slot 90 is enlarged to provide a somewhat cylindrical recess 91 adapted for loosely accommodating a pulley 92 which is operatively mounted therein by means of a small vertically extending pulley spindle 93, all as best seen in FIG. 7 and for purposes presently more fully appearing.

For reasons of elegance, the hinge-bosses 69 and 74 are externally provided with cam-shaped cover elements 94 suitably formed from stainless steel, aluminum, or other decorative material, and integrally including a circular top wall 95 which is marginally joined to a depending cylindrical skirt 96 which is continuous for an arc of 270° so as to fit snugly against the corner of the structure. The skirts 96 have vertical heights sufficient to cover the combined vertical height of the hinge-boss 69 and the bearing cup 34 associated therewith or the hinge-boss 74 and the bearing cup 22 associated therewith, as the case may be.

As shown in FIG. 6, the rear section 51 integrally includes a rectilinear rear plate 97 and a triangular top plate 98 which is somewhat thinner in vertical dimension than the top plate 53 of the front section 50. The rear plate 97 has the same perimetral dimensions as the face plate 52 of the front section 50 and the triangular top plate 98 is of such shape that when disposed in horizontal alignment with the top plate 53, the two will form a true rectangle. Furthermore, the forwardly presented vertical face 99 of the top plate 98 is located in juxtaposition to the vertical face 54 of the top plate 53. The dimensions of the top plates 53 and 98 are such that the vertical faces 54, 99, will be extremely close so as to give the appearance of a mere hairline crack and yet will have a few thousandths clearance between them so as to avoid any frictional engagement that would add drag to the lateral shifting movement of the front section 50 and rear section 51 relative to each other.

Formed integrally with the rear plate 97 and top plate 98 is a vertically extending flange plate 100 which is substantially similar and opposite to the flange plate 56. The flange plate 100 is in effect the lateral face or head of the wedge forming the interior section of the vault door C. Secured integrally to the interior faces of the rear plate 97 and flange plate 100 as to the underface of the top plate 98 is columnar slab 101 which has a vertical end face 102 extending perpendicularly to the rear plate 97. The columnar slab 101 is also provided with a rearwardly presented oblique face 103 which is spaced inwardly from, but is parallel to, the plane of the vertical face 99 of the top plate 98, and is so located as to lie in substantially close contiguous relationship to the oblique face 59 of the front section 50.

Milled into the columnar slab 101 along the oblique face 103 are four horizontally extending T-shaped slots 105 adapted for loose-fitting slidable engagement with the slide rails 82 of the front section 50. In this connection, it should be noted that the size of the slots 105 is such as to afford a few thousandths of clearance on all sides with respect to the slide rails 82 and head rails 83. In other words, the engagement between the head rails 83 and the slots 105 will not impose any frictional load of the relative sliding movement of the front section 50 and rear section 51, but nevertheless, will prevent unauthorized separation of the front section 50 from the rear section 51. Also welded to the forwardly presented face of the rear plate 97 respectively in horizontal alignment with the slots 105 are four horizontally projecting detent plates 106, each of which is provided with an upwardly facing groove 107 for loose-fitting inter-engagement within the groove 85 of the detent plate 84. The dimensions of the grooves 85 and 107 are also such that there is a few thousandths of clearance between the contiguous surfaces, thereby avoiding any frictional drag with respect to sliding movement of the rear section 51 with respect to the front section 50, but, nevertheless, will prevent unauthorized separation of the rear section 51 from the front section 50.

As will be seen by reference to FIGS. 5, 6 and 13, the forward oblique marginal portion of the top plate 98 extends over and is spaced upwardly from the top face 62 of the filler plate 61 and the correspondingly coplanar top plate of the rearwardly projecting portion of the slab 57 and in this overlying area, the top plate 98 is rigidly provided with a longitudinally extending slide-bearing plate 108 which rides upon the ball bearings 88, the vertical thickness of the slide-bearing plate 108 being such that when engaged upon the ball bearings 88, the top faces of the top plates 53 and 98 will be precisely coplanar.

Welded to the forwardly presented interior face of the rear plate 97 adjacent the lower end thereof is a horizontally projecting clevis-block 109 which operatively supports a horizontal roller-wheel 110 which is operatively mounted therein by means of a short axle-pin 111. The roller-wheel 110 is located so as to ride upon the oblique face 65 of the runner-block 64 as best seen in FIG. 13. Similarly, the oblique face 103 of the columnar slab 101 is provided with a recess 112 which houses a roller-wheel 113 operatively mounted therein by means of an axle-pin 114. The roller-wheel 113 is so located in dimension as to bear operatively against the oblique face 59 of the slab 57 in the front section 50 as best seen in FIG. 15. Thus, it will be seen that the weight of the rear section 51 is entirely supported by the ball bearings 88 and that the rear section 51 is capable of sliding laterally with respect to the front section 50 through the cooperation of the ball bearings 88 and the roller-wheels 110, 113.

As will be seen by reference to FIG. 7, when the vault door C is fully assembled and disposed in closurewise position within the door opening 1, the rear plate 97 will extend entirely across the width of the door opening and, at its vertically extending lateral edge, will project behind the rearwardly presented vertical margin of the plate 8. Similarly, as previously pointed out, the face plate 52 will project in the opposite direction beyond the forward vertical edge of the facing jamb 3. Moreover, the flange plates 56 and 100 are of substantially the same horizontal dimension, front-to-rear, so that when the vault door C is in closure-forming position within the doorway 1, it will form a box-like rectilinear structure which substantially fills the entire door opening for practically the entire horizontal depth thereof, and the laterally presented external faces of the flange plates 56, 100, will be in snug-fitting facewise abutment against the inwardly presented faces of the facing jamb 3 and the hinge jamb 4. As long as the front section 50 and rear section 51 are locked against lateral shifting movement, the vault door C cannot be swung outwardly away from closure-forming position within the door opening 1. As will be seen by reference to FIGS. 9, 11 and 13 locking is effected by inter-engagement between a pair of vertically aligned heavy detent blocks 115 which are welded upon the forwardly presented interior face of the rear plates 97 and a pair of relatively heavy locking dogs 116, 117, which are rockably mounted upon vertical pivot pins 118, 119, which are respectively mounted in mounting blocks 120, 121, which are welded upon the interior face of the flange plate 56 above and below the recess 66 respectively.

Operatively mounted on the face 60 of the slab 57 is a lock-operating yoke 122, which consists of a vertical cross-plate 123 which is welded or otherwise rigidly secured at its upper and lower ends to horizontally extending actuator bars 124, 125. The cross-plate 123 and the actuator bars 124, 125, are respectively provided with slots 126, 127, 128, 129, for slidable engagement with pins 130, 131, 132, 133, respectively, the latter having enlarged heads for retaining the lock-operating yoke 122 in position. At their ends, the actuator bars 124, 125, are respectively provided with projecting pins 134, 135, for rotative engagement in apertures 136, 137, respectively formed in the locking dogs 116, 117. Welded or otherwise rigidly secured to the rear face of the cross-plate 123 approximately midway between the actuator bars 124, 125, is a detent block 138 which bears laterally against the end face of a locking bar 139 which extends horizontally across and is slidably mounted upon the rearwardly presented face 60 of the slab 57 for movement along the line approximately midway between the upper and lower horizontal margins of the recess 66 or, in other words, midway between the slide rails 67, 68.

Mounted for horizontal slidable movement in and extending vertically between the slide rails 67, 68, is a carrier-plate 140, the vertically extending lateral edge of which is substantially coincident with the outwardly presented or external face of the flange plate 56 when the carrier-plate 140 is in inwardly shifted position. Welded or otherwise rigidly secured to the carrier-plate 140 adjacent this edge face is a cover plate 141 which, together with the edge of the carrier-plate 140, forms a complete snug-fitting closure within the recess 66. On its outwardly presented face, the cover plate 141 is provided with a suitable unobtrusive finger-hole 142 by which the carrier-plate 140 may be manually shifted outwardly through the recess 66 whenever the vault door C is open.

Rigidly secured to the locking-bar 139 and extending vertically upwardly and downwardly therefrom is a cross-bar 143 which is operatively connected at its upper and lower ends to horizontal slidable lock-bolts 144, 145, which form operative elements of two conventional combination locks 146, 147. These combination locks 146, 147, may be of any conventional design and, therefore, are not described in detail herein. It is sufficient, for present purposes, to note that the combination locks 146, 147, are bolted or otherwise rigidly secured upon the rearwardly presented flat face of the carrier-plate 140 and are detachably connected by ball-snap detents 148, 148', to the usual spindle rods 149, 149', which projects rotatably through the slab 57 and face plate 52, reference being made to FIG. 38 emerging at the forward face of the pront section 50 and being there provided with conventional combination knobs 150, 151.

Suitably mounted on and carried by the carrier-plate 140, as illustrated in FIG. 11, is a conventional time-lock 152 having the usual number of clock dials and setting knobs upon its exposed face. Since the time lock 152 is entirely conventional, it is not shown or described in detail herein. It is merely sufficient for present purposes to point out that, in common with all time locks of this type, the time-lock 152 is provided on its interior side wall 153 with a rectangular window 154 that is ordinarily blocked by a heavy closure plate (not shown) whenever the time-lock 152 is "off time," that is to say, in locking position. The distal end of the lock-bar 139 is located within the window 154 so that it is in endwise abutment with this closure plate of the time-lock 152 and it, therefore, cannot be shifted lengthwise. When, however, a particular time of the day arrives at which the time-lock 152 is set to open, the obstructing closure plate is automatically moved away from alignment with the window 154 and then the locking-bar 139 can be shifted to open position, provided, of course, the combination locks 146, 147, are also unlocked by correct manipulation of the combinations thereof. Whenever the locking-bar 139 is locked or, in other words, prevented from movement, by either combination locks 146, 147, the time-lock 152, or all three of these, the locking-bar 139 will abut against the detent block 138 and prevent shifting movement of the lock-operating yoke 122.

Rotatably and shiftably mounted in a horizontal aperture or drill-hole 155 formed in the slab 57 and face plate 52 is a shaft 156 which normally projects outwardly beyond the forward plane of the face plate 52 and is rigidly provided on its projecting end with a series of radially projecting spokes 157 which, in effect, form a hand wheel by which the shaft 156 may be rotated, all as best seen in FIGS. 12 and 14. At its rear end, the shaft 156 is axially bored and tapped for receiving a bolt 158 having a diametrally enlarged head 159. Also at its rear end, the shaft 156 is turned down so as to provide an annular groove 160. Rotatably disposed within this groove is a collar 162 which is provided with two diametrally opposed radial drill holes 163, 164, for retentive engagement with the prong-like hems 165, 166, of a rat-trap type spring 167 which is centrally provided with a U-shaped eye 168 that, in effect, divides the spring convolutions into two halves. The spring 167 is rigidly mounted upon the slab 57 by means of a screw 169 which extends through the eye 168. The spring 167 operates to bias the shaft 156 into forwardly projecting position, as shown in FIG. 9. Moreover, the collar 162 and head 159 are diametrally larger than the drill hole 155 so as to prevent unauthorized forward withdrawal of the shaft 156 from the drill hole 155 and to serve as a stop therefor. Forwardly of the collar 162, the rearward end of the shaft 156 is slidably, but non-rotatably, splined in an eccentric collar 170 which is held against forward and rearward movement against the rearwardly presented flat vertical face 171 of a recess 172 which opens upon the oblique face 59 of the slab 57. On its rear side, the eccentric collar is held against shifting movement by means of a retainer plate which is held in place by bolts 173 and spacer-studs 174. Rockably mounted upon the eccentric collar 170 and operatively disposed within the recess 172 is a link 175 which is operatively connected to the cross-plate 123 of the lock-operating yoke 122 by means of a pin 176.

Assuming that the time-lock 152 and combination locks 143, 144, are unlocked so that the locking-bar 139 and lock-operating yoke 122 are free to move, then, upon rotation of the shaft 156, the link 171 will shift the lock-operating yoke 122 to the right, reference being made to FIG. 3, and, thereby rocking the locking dogs 116, 117, forwardly away from the rear plate 97 and out of locking engagement with the detent blocks 115. When this occurs, the rear section 51 is free to shift laterally with respect to the front section 50.

It will be noted by reference to FIG. 7 that the vertical edge face of the rear plate 97 which is located adjacent to the inwardly presented face of the hinge jamb 4 is spaced a slight distance away from the hinge jamb 4 and, at its upper end, bears against a roller 177 which is operatively mounted for rotation about a vertical axle-pin 178 set into a cup-like recess 179 formed in the upper rear corner of the hinge jamb 4. Mounted in and extending horizontally along the space between the front section 50 and the rear section 51, is a stretched tension spring 180 which is secured to the front section 50 by means of a pin 181 and to the rear section 51 by means of a pin 182. The spring 180 is under tension when installed so that it will normally bias the rear section 51 laterally so that the vertical edge face thereof will bear against the roller 177 when the vault door C is in closure-forming position within the door-opening 1. Similarly mounted in the space between the top plate 98 and the underlying top face of the slab 57 is a stretched spring 180' rigidly secured at its inner end by a pin 181' to the rear section 51 and at its other end, the spring 180' is connected by a block 182' to a flexible woven wire cable 183 which extends slidably through a block 184, the latter being welded or otherwise rigidly attached to the rear section 51. Beyond the block 184, the cable 183 is trained around the pulley 92 and extends through the slot 90, terminating in a plug 185 by which it is rigidly attached to the hinge jamb 4 in such position as to pass tangentially through the groove 46 of the segmental pulley 45.

When the vault door C is unlocked, by disengagement of the locking dogs 116, 117, the spokes 157 may be manually grasped and the entire door C pulled forwardly and swung about its hinges. Since the rear section 51 is free to shift laterally with respect to the forward section 50 and is biased laterally against the roller 177, the forward swinging movement of the front section 50 will take place about the hinges, but the swinging movement of the rear section will take place about the centerline of the roller 177 and, therefore, the vault door C will swing clear of the inwardly presented vertical face of the facing jamb 3. In other words, the rear section 51 will no longer be rectangularly blocked within the door-opening 1. The vault door C will swing through the successive positions shown in FIGS. 22 to 26, inclusive, and the cable 183 will, in effect, wrap itself around the stationary pulley 45. As the front section 50 swings outwardly, the effective length of the cable 183 will shorten, so to speak, and after the vault door C has reached a certain outwardly swung position where both the rear section 51 and the front section 50 are clear of the door-opening 1, the cable 183 will begin to operate as an actuator and will shift the rear section 51 relatively to the front section 50 in the opposite direction to that in which the rear section originally shifted when in contact with the roller 177. This shifting movement in the opposite direction will bring the front section 50 and rear section 51 into completely registered rectilinear alignment so that when the vault door C is fully open, it will assume a completely block-like appearance, as shown in FIG. 2, and all visible side faces will be precisely coplanar.

As will be seen by reference to FIG. 9, the longitudinal centerline of the shaft 156 is located inwardly from the plane of the outwardly presented abutment face of the flange plate 100 by a sufficient distance so that the inwardly presented end face of the bolt head 159 will abut against the oblique face 103 of the columnar slab 101. This same abutment will continue to a greater or lesser degree as the rear section 51 is shifted laterally to the right (reference being made to FIG. 9). Consequently, when the front section 50 and rear section 51 are in such relative positions, the shaft 156 cannot be pushed inwardly. However, when the vault door C is pulled to nearly open position and the rear section 51 has been shifted back to the right approaching block-like configurations, the columnar slab 101 will be shifted away from overlying abutment with respect to the shaft 156 and, thereupon, the shaft 156 is free to be shoved inwardly into telescoped position with the inner surfaces of the spokes 157 lying very close to or actually abutting the front surface of the face plate 52. In this connection, it is to be noted that the horizontal thickness of the spokes 157 is such that they will fit conformably within the space between the front surface of the face plate 52 and the forwardly presented surface of the face wall A when the vault door C is in fully opened position and, thus, the vault door C may, when open, stand truly parallel to the forward surface of the face wall A.

It is possible to provide a modified form of vault door C' substantially as shown in FIGS. 27–30 which is similarly mounted in a door frame 185, the latter being substantially identical to the door frame 2 and consists of a pair of upright jambs 186, one of which is a facing jamb and the other of which is a hinge jab. The door frame 185 is similarly set into the wall in the same manner as the door frame 2 by pouring concrete into suitable forms so that the resulting structure is heavily reinforced. Welded or otherwise rigidly secured to the inwardly presented face of the hinge jamb 186 is a relatively heavy steel plate 187. The hinge jamb 186 is provided with a recess (not shown), for accommodating a bearing cup 188 which houses a hinge bearing similar to the hinge bearing 33.

Disposed in snug-fitting closure-forming disposition within a door opening 189 is the vault door C' which generally comprises a wedge-shaped front section 190 and a wedge-shaped rear section 191 which are substantially identical to the previously described front and rear sections 50, 51, respectively. Again, the terms "front" and "rear," used in reference to the sections 190, 191, have reference to the relative positions of these sections when the vault door C' is in the "closed" position as shown in FIGS. 27 and 28. The two sections 190, 191, form a somewhat rectangular structure composed of two facewise, superimposed laterally sliding wedges as best seen in FIGS. 29 and 30. The front section 190 also includes a hinge boss 192 which is disposed within the bearing cup 188 and supports the vault door C' in the manner that the hinge boss 69 supported the door C.

The front section 190 includes a rectangular face plate 193 and a flange plate 194 along one of its lateral margins, the flange plate 194 being adapted to abut the heavy steel plate 187 when the door C' is in the closed position as shown in FIG. 28. The rear section 191 includes a rectangular face plate 195 which is polished so that when the door C' is opened, the plate 195 will be presented outwardly and exposed to public view.

The rear section 191 is provided with a thin flat recess 196 along its lateral margin adjacent to the hinge jamb 186 for accommodating a guide link 197, the latter being secured to the rear section 191 through a pivot pin 198. The guide link 197 is provided with a U-shaped notch 199 on its lateral margin facing the hinge jamb 186 and is sized to accommodate a laterally projecting finger 200 integrally formed on an extended portion of the steel plate 187 in the manner as shown in FIG. 29. The front section 190 is preferably, though not necessarily, formed with a recess 201 along its upper face, the recess 201 having a flat bottom wall 202 which is spaced forwardly from the link 197 and which provides clearance for the link 197.

The inwardly presented surface of the face plate 195 serves as a suitable rear stop and, in effect, limits the movement of the link 197. The link 197 is also forwardly biased by means of a hair pin spring 203 which is pivotally secured to the upper face of the link 197 through a pin 204 and to the upper face of the rear section 191 through a pin 205. The pin 205 serves as an effective forward stop for the link 197.

Referring now to FIGS. 28–30, it can be seen that the link 197 serves as an effective means to shift the rear section 191 to the left, reference being made to FIG. 28, when the door C' is being shifted to the "closed" position. Thus, when the door C' is in the fully closed position as shown in FIG. 28, the notch 199 engages the finger 200. Therefore, the link 197 will lie within the recess 196 and abut the inwardly presented surface of the rear face plate 195. When the door C' is in the closure-forming position in the door opening 189, it will form a box-like rectilinear structure which substantially fills the entire door opening 189 for the entire horizontal depth thereof. Moreover, the laterally presented face of the flange 194 will be in snug-fitting facewise abutment against the inwardly presented face of the steel plate 187. In this manner, the front section 190 and rear section 191 are locked against lateral shifting movement in the same manner that the front section 50 and rear section 51 were locked so that the vault door C' cannot be swung outwardly away from its closure-forming position within the door opening 189.

When the vault door C' is unlocked, the rear section 191 will be free to shift laterally with respect to the front section 190. The vault door C' is then capable of swinging through the successive positions shown in FIGS. 28–30. As the front section 190 swings outwardly, the rear section 191 will then shift to the right, reference being made to FIG. 28, and the U-shaped notch 199 will maintain contact with the finger 200 until the door C' reaches the position as show in FIG. 29. As the door C' is swung to its open position, the link 197 will be biased against the pin 205 through the action of the hair pin spring 203.

When the door C' is moved to the closure-forming position, the notch 199 will engage the finger 200 when the door C' reaches the position as shown in FIG. 29. At this point, further closing of the front section 190 will, in effect, cause the link 197 to shift the rear section 191 to the left. This shifting will occur until the door C' has reached its fully closed position, as shown in FIG. 28.

It is possible to provide another modified form of vault door C'' substantially as shown in FIGS. 31–37, which is similarly mounted in a door-frame 206, the latter being substantially identical with the door-frames 185 and 2. The door-frame 206 consists of a facing jamb 207 and spaced hinge jamb 208, thereby forming a doorway 209. The door-frame 206 is set into the wall in the same manner as the door-frame 2 by pouring concrete into suitable forms so that the resulting structure is heavily reinforced.

Disposed in snug-fitting closure-forming disposition within the doorway 209 is the vault door C'' which generally comprises a wedge-shaped front section 210 and a wedge-shaped rear section 211. The terms "front" and "rear", as used in reference to the sections 210, 211, have reference to the relative positions of the sections when the vault door C'' is in the "closed" position, that is the position as shown in FIGS. 31 and 32. The two sections 210, 211, are substanitally identical with the previously described front and rear sections 50, 51, respectively, and are, therefore, neither illustrated nor described in detail herein with respect to this modification. When in the "closed" position, the two sections 210, 211, in effect, form a structure of two facewise superimposed laterally sliding wedges.

The front section 210 integrally includes a rectangular face plate 212 and a vertically extending flange plate 213 along one of its lateral margins and which is adapted to abut the hinge jamb 208 when the door C'' is in the "closed" position. The rear section 211 integrally includes a rear face plate 214 and a flange plate 215, the latter being adapted to abut the facing jamb 207 when the door C'' is in the closed position.

The vaulted door C'' is hingedly secured to the doorframe 206 in the same manner as the vault door C is secured to the door-frame 2. The vault door C'' is provided with a bearing boss 216 which is disposed upon and supported by a bearing block 217, the latter including a depending flange 218 for securement to the forward face of the hinge jamb 208. The bearing boss 216 is hingedly maintained in the bearing block 217 through a tapered pin 219 which serves as an inner race and fits within a circular recess 220 formed within the bearing block 217 and is journaled in roller bearings 221. The bearing boss 216 and bearing block 217 are enclosed within a cover plate 222. The upper face of the bearing block 217 is recessed to accommodate the head 223 of a pivot pin 224 and pivotally secured to the lower end thereof is a rocking ram 225 which is held by a lock washer 226.

Figure 33:
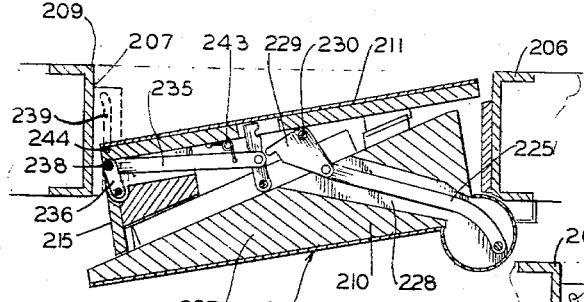
Figure 34:
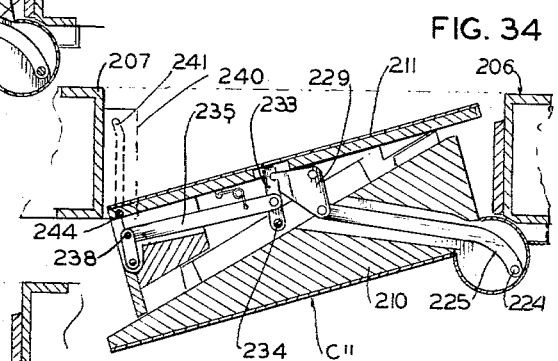
Figure 35:
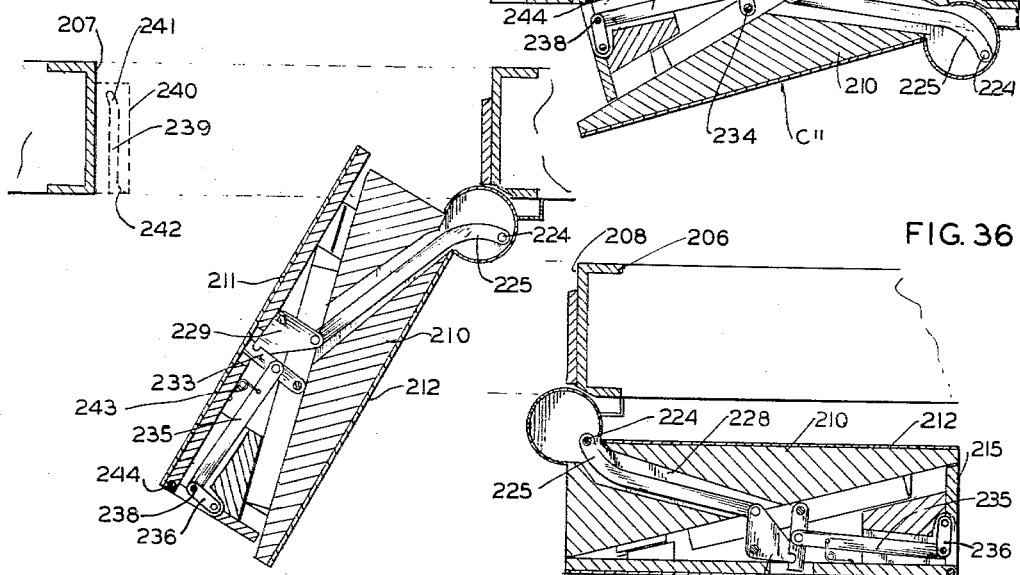

The front section 210 integrally includes a horizontal top plate 227 which is provided with an elongated groove 228 for accommodating the arm 225. By reference to FIG. 32 it can be seen that the groove 228 is substantially wider than the arm 225 so as to provide a clearance for the arm 225 during its rocking movement. Pivotally secured to the other end of the arm 225 is a bell crank 229 which is, in turn, pivotally secured to the top plate of the rear section 211 through a pivot pin 230. By reference to FIG. 32, it can be seen that the pivotal connection between the bell crank 229 and the rocking arm 225 is more or less free-floating. The bell crank 229 integrally includes an extended finger 231 which is adapted to engage a U-shaped notch 232 formed within a locking link 233, the latter being pivotally secured at one end to the top face of the rear section 211 through a pivot pin 234. Pivotally secured to the locking link 233 somewhat centrally thereof is a connecting arm 235 which is, in turn, centrally pivoted on a guide link 236, the latter, in turn, being pivotally secured at one end to the top face of the rear section 211 through a pivot pin 237. The other end of the guide link 236 is, in effect, free-floating and is provided with an upstanding guide pin 238, the latter being moved within an elongated slot 239 formed with a horizontally extending plate 240, the latter being welded or otherwise rigidly secured to the facing jamb 206, substantially as shown in FIGS. 33, 34, and 35. By reference to FIG. 35, it can be seen that the slot 239 is provided at its rearward end with an arcuate camming portion 241 which extends laterally to the left and at its forward end is provided with a camming portion 242. The connecting arm 235 is biased out of locking engagement to the position as shown in FIG. 32 through a sear spring 243, the latter being pivotally secured to the connecting arm 235 to the top face of the rear section 211, all as can best be seen by reference to FIG. 32.

Figure 36:
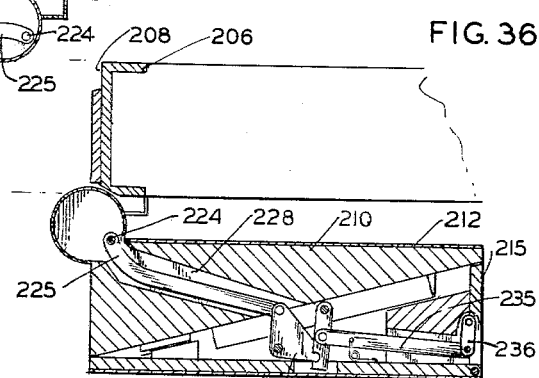

When the vault door C'' is unlocked, in the same manner as the vault door C is unlocked, the entire door C'' is pulled forwardly and swung about its hinges. Since the rear section 211 is free to shift laterally with respect to the forward section 210, and is biased laterally toward the hinge jamb 208 through the action of the sear spring 243, the forward swinging movement of the front section 210 will take place about the hinges. However, during the initial movement of the door C'' to the open position, the rear section 211 will shift laterally, to the right, reference being made to FIG. 32. The front door C'' will swing through the successive positions shown in FIGS. 32 to 36, inclusive. During the initial portion of the outward swing, the pin 244, and the guide pin 238 will ride within the elongated slot 239. As the pin 244 moves within the camming portion 241, it will, in effect, cause the rear section 211 to shift to the right with respect to the front section 210. The rear section 211 will continue to shift to the right with respect to the front section 210 during the portion of the time that the pin 244 rides within the slot 239. It can be seen that the front section 210 is swung about an arc and the rear section is, in effect, moved in a straight line through the action of the pin 244, riding in the slot 239 during shifting to the right. However, after the guide pin 238 has cleared the slot 239, the finger 231 will engage the U-shaped notch 232 in the locking link 233 as shown in FIG. 36. As this occurs, the further rotation of the vault door C" will cause the rocking arm 235 to shift the bell crank 229 about the pin 230 which, in effect, will shift the rear section 211 to the left with respect to the front section 210, and the door C" finally reaches the fully open position as shown in FIG. 36. This shifting movement in the opposite direction will bring the front section 210 and rear section 211 into completely registered rectilinear alignment so that when the vault door C" is fully opened, it will assume a completely block-like appearance, as shown in FIG. 36, and all visible side faces will be precisely coplanar.

When the door C" is swung from the open position to the closed position, the rear section 211 will begin to shift to the right with respect to the front section 210. When the door reaches the position as shown in FIG. 34, the pin 238 will abut the camming portion 242 and cause disengagement between the finger 231 and the notch 232. When the guide pin 244 moves into the slot 239, the rear section 211 will continue to shift to the left with respect to the front section 210, since the rear section 211 is, in effect, shifting in a straight line while the front section 210 is moved in an arcuate path. This shifting movement continues to occur until the door has reached a fully closed position, as shown in FIG. 32.

It should be understood that changes and modifications in the form, construction, arrangement, and combination of the several parts of the doors may be made and substituted for those herein shown and described without departing from the nature and principle of my invention.

Having thus described my invention, what I claim and desire to secure by Letters Patent is:

1. A vault door comprising a door-frame adapted to define a passageway through a wall having oppositely presented outer surfaces, said door-frame having substantial width in the direction of the perpendicular distance between said wall-surfaces, and including a hinge jamb and a facing jamb, a relatively thick door hingedly mounted on the door-frame and being adapted to move from a closed to an open position, said door comprising a first wedge-shaped section substantially covering the entire area defined by the door frame and having the head of the wedge in abutment with the hinge jamb when the door is closed, hinge means operatively mounted on said first section and said door-frame adjacent to the plane of one of the wall-surfaces for hingedly swinging said door with respect to said frame, a second wedge-shaped section slidably mounted on said first section and having the head of the wedge in abutment with the facing jamb, said second section being adapted to shift laterally with respect to said first section as the door is opened to as to permit the second section to clear the facing jamb, and locking means for optionally locking said second section to said first section to prevent relative movement between the two sections.

2. A vault door comprising a door-frame adapted to define a passageway through a wall having oppositely presented spaced parallel outer surfaces, said door-frame having substantial width in the direction of the perpendicular distance between said wall-surfaces and including laterally spaced vertical planar jambs, one of said jambs being a facing jamb and the other being a hinge jamb, said jambs having external faces disposed substantially perpendicular to said outer wall surfaces, a door hingedly mounted on the door-frame and being adapted to move from a closed to an open position, said door comprising a first section provided with a flat abutment face adapted for facewise abutment with said hinge jamb, hinge means operatively mounted on said first section adjacent to the plane of the abutment face, said hinge means being operatively mounted on said door-frame adjacent to the plane of one of the wall-surfaces for hingedly swinging said door with respect to said frame, a second section slidably mounted on said first section and being adapted to shift laterally with respect to said first section said second section having a flat abutment face adapted for facewise abutment with said facing jamb when said door is in the closed position, and means connected to said second door section for shifting said second door section laterally toward the hinge jamb so as to permit the second door section to clear the facing jamb as the door is opened.

3. A vault door comprising a door-frame adapted to define a passageway through a wall having oppositely presented outer surfaces, said door-frame having substantial width in the direction of the perpendicular distance between said wall-surfaces, said door frame having a planar facing jamb and a planar hinge jamb perpendicularly disposed to one outer face of said wall, a relatively thick door hingedly mounted on the door-frame and being adapted to move from a closed to an open position, said door comprising a first section having a lateral flat abutment face adapted for facewise abutment with said hinge jamb when the door is in the closed position, hinge means operatively mounted on said first section adjacent to the plane of the abutment face, said hinge means being further operatively mounted on said door-frame adjacent to the plane of one of the wall-surfaces for hingedly swinging said door with respect to said frame, a second section slidably mounted on said first section and being adapted to shift laterally with respect to said first section as the door is opened, said second section having a lateral flat abutment face adapted for facewise abutment with said facing jamb when the door is in the closed position, and means for locking and unlocking the two sections to each other so as to optionally prevent and allow relative shifting movement therebetween.

4. A vault door comprising a door-frame having a planar facing jamb and a planar hinge jamb, a door hingedly mounted on the door-frame and being adapted to move from a closed to an open position, said door comprising a first section having a lateral flat abutment face adapted for facewise abutment with said hinge jamb when the door is in the closed position, hinge means operatively mounted on said said first section adjacent to the plane of the abutment face, said hinge means being further operatively mounted on said door-frame for hingedly swinging said door with respect to said door-frame, a second section, sized to snugly fit within said door frame when said door is closed, said second section having a lateral flat abutment face adapted for facewise abutment with the facing jamb when the door is in the closed position, the opposed longitudinal faces of said sections having overhanging vertically registered portions defining a longitudinal chamber, said second door section being adapted to shift laterally toward the hinges mounted on the first door section so as to permit the second door section to clear the door frame as the door is opened, and slide-bearing means disposed within said chamber to support said second section for slidable movement in relation to the first section.

5. A vault door comprising a door-frame adapted to define a passageway through a wall having oppositely presented spaced surfaces, said frame having a planar facing jamb and a planar hinge jamb transversely connected by a transom member, said jambs being in spaced parallel relation and substantially perpendicular to the plane of at least one of said wall surfaces, a door hingedly mounted on the door-frame and being adapted to move from a closed to an open position, said door comprising a first section having a flat abutment face adapted for facewise abutment with said hinge jamb when said door is closed, hinge means operatively mounted on said first section adjacent to the plane of the abutment face, said hinge means being further operatively mounted on said door-frame for hingedly swinging said door with respect to said door-frame, a second section having a laterally presented abutment face which is normally in facewise abutment against the inwardly presented face of the facing jamb along a sufficient width so that the door cannot swing open as long as such abutment is maintained, the opposed top faces of said sections having overhanging vertically registered portions which are vertically spaced to provide a horizontally extending space, slide-bearing means disposed within said horizontally extending space for supporting said second section during its slidable movement on the first section, roller bearing means mounted in the lower portion of said second section and bearing against said first section, and articulating means disposed between asid first and second sections for moving said second section relatively to the first section when said door is swung upon the hinge means and thereby moves between closed and open position.

6. A vault according to claim 5 in which the articulating means is a flexible cable which operates against the bias of a tension spring.

7. A vault door according to claim 5 in which the articulating means is a link which is operated by a cam associated with the hinge means.

8. A vault door according to claim 5 in which the articulating means is a link which is operated by a cam.

9. A vault door according to claim 5 in which the articulating means is a link which is operated by a cam associated with the hinge means and also includes a spring-biased dog which engages the hinge jamb during the final increment of closing movement whereby to shift the second section laterally into abutment with the inwardly presented face of the facing jamb.

10. A vault door according to claim 5 further characterized in that the articulating means includes an arm which is movable with the first section and is operatively connected to the second section through a locking link which is pivotally mounted on the second section.

11. A vault door according to claim 5 further characterized in that an element having a guide slot is mounted in the transom member, the second section has a pin which is movable in the guide slot, and said articulating means is provided with a linking means for operative connection to said guide pin for shifting said second section with respect to said first section when said pin is movable in said slot.

12. A vault door comprising a door-frame having a facing jamb and a hinge jamb, a door hingedly mounted on the door-frame and being adapted to move from a closed to an open position, said door comprising a first section substantially covering the entire area defined by the door frame, hinge means operatively mounted on said first section and said door-frame for hingedly swinging said door with respect to the door-frame, a second section having a lateral face slidably mounted on said first section and being adapted to shift laterally toward and away from the hinge jamb, a locking mechanism operatively associated with said door for optionally preventing such shifting movement, said lateral face of said second section being in abutment with the facing jamb when the door is closed, said facing jamb and lateral face of the second section in abutment therewith being positioned at such an angle so as to prevent outward movement of said door when the door is locked, a spring for biasing said second section toward the hinge jamb, and a flexible cable having one end secured to said door frame and the other end secured to said second door section, said flexible cable further supported by a pulley mounted on said first section, said cable and spring being adapted to maintain said second section in abutment with the facing jamb when the door is closed and to move the second section toward the hinge jamb as the door is opened.

13. A vault door comprising a door-frame having a facing jamb and a hinge jamb, a door hingedly mounted on the door-frame and being adapted to move from a closed to an open position, said door comprising a first section, hinge means operatively mounted on said first section and said door-frame for hingedly swinging said door with respect to the door-frame, a second section slidably mounted on said first section and being adapted to shift laterally toward and away from the hinge jamb, a locking mechanism operatively associated with said door for optionally preventing such shifting movement, a means operatively associated with said locking mechanism and being adapted, upon actuation, to open said locking mechanism permitting said second section to shift relative to said first section, a cylindrical surface mounted in the hinge jamb adjacent to the outwardly presented transverse face of the second section in radially spaced relation to the hinge means, said second section having a laterally presented edge-surface bearing against said cylindrical surface approximately along the plane of said outwardly presented transverse surface when the door is in closed position, and spring means biasing said second section into abutment against said cylindrical surface during the initial increment of swinging movement as the door is swung from closed position to open position whereby to cause the second section, during such increment, to pivot around the center-line of the cylindrical surface rather than the axis of the hinge means.

14. A vault door comprising a door-frame having a facing jamb and a hinge jamb, said jambs being provided with inwardly presented juxta-posed faces, a door hingedly mounted on the door-frame and being adapted to move from a closed to an open position, said door comprising a first section, hinge means operatively mounted on said first section and said door-frame for hingedly swinging said door with respect to said door-frame, a second section having a laterally presented face which is normally in abutment against the inwardly presented face of the facing jamb along a sufficient width so that the door cannot swing open as long as such abutment is maintained, the opposed top faces of said sections having overhanging vertically registered portions which are vertically spaced to provide a horizontally extending space, slide-bearing means disposed within said horizontally extending space for supporting said second section during its slidable movement on the first section, bearing means mounted in the lower portion of said second section and bearing against said first section, articulating means disposed between said first and second sections for moving said second section relative to the first section when said door is swung upon the hinge means and thereby moves between closed and open position, a stationary element operatively mounted on said hinge jamb and extending inwardly therefrom, and a movable element operatively mounted on said second section and being engageable by said stationary element, said movable element being adapted to shift said second section with respect to said first section when said movable element is in engagement with said stationary element.

15. Vault closure means comprising in combination a frame defining a door-opening, said frame including a pair of upright jambs transversely connected across the top with a transom member, said jambs having opposed faces of substantial width, a door including two relatively movable sections adapted to shift from a compact position to an extended position, said sections being of such size and shape that when the sections are in compact position they conjointly assume a perimetrical shape substantially identical with and fitting snugly in the door opening, hinge means operatively mounted on one section and said support frame for hingedly swinging said door with respect to said frame, locking means for rigidly and immovably securing said sections together in compact position, and power transference means operatively mounted between said first and second sections for shifting said sections to an extended position responsive to swinging movement of the door.

16. Vault closure means comprising in combination a frame defining a door-opening, said frame including a hinge jamb and a facing jamb transversely connected across the top with a transom member, said jambs having opposed faces of substantial width, a door including first and second relatively movable sections adapted to shift from a compact position to an extended position, said sections being of such a size and shape that when the sections are in compact position they conjointly assume a perimetrical shape substantially indentical with and fitting snugly in the door opening, said first door section having a lateral face of substantial width in abutment with said hinge jamb when the door is closed, said second door section having a lateral face of substantial width in abutment with said facing jamb when the door is closed, hinge means operatively mounted on said first section and said hinge jamb for hingedly swinging said door with respect to said frame, locking means for rigidly and immovably securing said first and second door sections together in compact position, and power transference means operatively mounted between said first and second sections for shifting said sections to extended position responsive to swinging movement of the door.

17. Vault closure means comprising in combination a frame defining a door-opening, said frame including a hinge jamb and a facing jamb transversely connected across the top with a transom member, said jambs having opposed faces of substantial width, a door including first and second relatively movable sections adapted to shift from a compact position to an extended position, said sections each being of such size and shape that when the sections are in compact position they conjointly assume a perimetrical shape substantially indentical with and fitting snugly in the door opening, said first door section having a lateral face of substantial width in abutment with said hinge jamb when the door is closed, said second door section having a lateral face of substantial width in abutment with said facing jamb when the door is closed, hinge means operatively mounted on one section and said support frame for hingedly swinging said door with respect to said frame, locking means for rigidly and immovably securing said sections together in compact position, said facing jamb and said lateral face of the second door section in abutment therewith being disposed at such an angle so as to prevent the opening of the door when the first and second sections are locked one to the other, and power transference means operatively mounted between said first and second sections for shifting said sections to extended position responsive to swinging movement of the door.

18. A vault door having a door-frame provided with a facing jamb and hinge jamb, of substantial width, a door hingedly mounted on the door-frame and being adapted to move from a closed to an open position, said door comprising a first section, hinge means operatively mounted on said first section and said door-frame in juxtaposition to said hinge jamb for hingedly swinging said door with respect to said door-frame, a second section sized to fit snugly within and completely close the area defined by said door frame, said second section having a planar lateral face of substantial width, said lateral face being adapted to abut against one of said facing jambs of said door frame when the door is closed, an outwardly extending slide element mounted on one of the longitudinal faces of said second section, groove means formed on the opposed longitudinal face of said first section and being sized to slidably accommodate the slide element of said second section so that said second section is slidably mounted on said first section and is adapted to shift laterally with respect to said first section as the door is opened, said door frame and said lateral face of said second door section being disposed at such an angle so as to prevent opening of the door when relative movement between the first and second door sections is prevented, said first section having a pocket, handle means extending through the first section and terminating within said pocket, link means operatively mounted within said first section and being connected to said handle means, locking means operatively associated with said door for optionally preventing movement of the link means, crank-forming means operatively connecting said handle means and said link means, said crank-forming means being adapted to move said link means when said locking means is opened.

References Cited by the Examiner

UNITED STATES PATENTS

| | | | |
|---|---|---|---|
| 2,387,172 | 10/1945 | Mosler et al. | 109—74 |
| 2,732,815 | 1/1956 | Paca et al. | 109—59 |
| 2,860,584 | 11/1958 | Deaton et al. | 109—59 |
| 3,029,753 | 4/1962 | Deaton | 109—74 |

HARRISON R. MOSELEY, *Primary Examiner.*

CHARLES E. O'CONNELL, *Examiner.*

C. S. KAIMAN, L. J. SANTISI, *Assistant Examiners.*